United States Patent
Siegel

(10) Patent No.: US 10,295,997 B2
(45) Date of Patent: May 21, 2019

(54) DIAGNOSTIC TOOL AND DIAGNOSTIC METHOD FOR DETERMINING AN INTERRUPTION IN A PLANT

(71) Applicant: SIEMENS AKTIENGESELLSCHAFT, München (DE)

(72) Inventor: Tobias Siegel, Nürnberg (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 0 days.

(21) Appl. No.: 15/493,980

(22) Filed: Apr. 21, 2017

(65) Prior Publication Data

US 2017/0308073 A1 Oct. 26, 2017

(30) Foreign Application Priority Data

Apr. 22, 2016 (EP) .................................... 16166687

(51) Int. Cl.
*G05B 23/02* (2006.01)
*G05B 19/418* (2006.01)
*G06Q 10/06* (2012.01)

(52) U.S. Cl.
CPC ..... *G05B 23/0275* (2013.01); *G05B 19/4183* (2013.01); *G05B 23/02* (2013.01);
(Continued)

(58) Field of Classification Search
CPC .. G05B 19/4183; G05B 23/02; G05B 23/0272; G05B 23/0275; G05B 23/0283; G06Q 10/06313
(Continued)

(56) References Cited

U.S. PATENT DOCUMENTS 6,219,626 B1 * 4/2001 Steinmetz ........... G06F 11/2257
702/182
6,298,454 B1 * 10/2001 Schleiss ............. G05B 23/0227
714/37
(Continued)

FOREIGN PATENT DOCUMENTS

CN 1802613 A 7/2006
CN 101897098 A 11/2010
(Continued)

OTHER PUBLICATIONS

Geer D H et al: "A Modern Condition Monitoring and Gas Turbine Control System" vol. 5: Manufacturing Materialsand Metallurgy; Ceramics; Structures and Dynamics; Controls, Diagnostics and Instrumentation; Education; Process Industries; Technology Resources p. V005T14A005, XP055474359, DOI: 10.1115/84-GT-220, ISBN: 978-0-7918-7950-4; 1984.

*Primary Examiner* — John H Le
(74) *Attorney, Agent, or Firm* — Henry M. Feiereisen LLC

(57) ABSTRACT

A diagnostic tool, a computer software program, and a method for determining an interruption in a plant with at least one device includes determining a plant status at a recording time by recording at least one plant status value and transmitting the plant status to the diagnostic tool, determining a device status at a recording time by recording at least one device status value and transmitting the device status to the diagnostic tool, assigning a shared time base to the transmitted device status and the transmitted plant status, and correlating the transmitted device status and the transmitted plant status by coordinating the device status and the plant status on the shared time base.

19 Claims, 3 Drawing Sheets

(52) U.S. Cl.
CPC ..... *G05B 23/0272* (2013.01); *G05B 23/0283* (2013.01); *G06Q 10/06313* (2013.01)

(58) Field of Classification Search
USPC .............. 702/182, 183, 185; 700/26; 714/37
See application file for complete search history.

(56) References Cited

U.S. PATENT DOCUMENTS

| | | | |
|---|---|---|---|
| 2005/0197803 A1* | 9/2005 | Eryurek | G05B 23/0289 702/185 |
| 2006/0143547 A1 | 6/2006 | Haaks et al. | |
| 2008/0154545 A1 | 6/2008 | Maier et al. | |
| 2010/0276930 A1 | 11/2010 | Fortmann | |
| 2012/0093647 A1 | 4/2012 | Bengtson et al. | |
| 2013/0173663 A1 | 7/2013 | Piccazzo | |

FOREIGN PATENT DOCUMENTS

| | | |
|---|---|---|
| DE | 102004050386 A1 | 5/2006 |
| DE | 102014207175 A1 | 10/2015 |
| JP | S6421509 A | 1/1989 |
| WO | WO 2010128520 A2 | 11/2010 |

* cited by examiner

DIAGNOSTIC TOOL AND DIAGNOSTIC METHOD FOR DETERMINING AN INTERRUPTION IN A PLANT

CROSS-REFERENCES TO RELATED APPLICATIONS

This application claims the priority of European Patent Application, Serial No. 16166687.0, filed Apr. 22, 2016, pursuant to 35 U.S.C. 119(a)-(d), the content of which is incorporated herein by reference in its entirety as if fully set forth herein.

BACKGROUND OF THE INVENTION

The present invention relates to a diagnostic tool and diagnostic method for determining an interruption in a plant with at least one device.

The following discussion of related art is provided to assist the reader in understanding the advantages of the invention, and is not to be construed as an admission that this related art is prior art to this invention.

The plant status indicates the status of the machine/plant as a whole (from a customer's point of view). The plant status can include e.g. the utilization time, idle time, interruption, maintenance, servicing etc. as explained for instance in OMAC, "Organization for Machine Automation and Control". Moreover, the plant status can also include the device status.

Interruptions can therefore occur in the devices and in the plant status. A categorization of the interruption, according to an interruption due to maintenance or during operation is only possible with considerable manual effort.

Machine or plant statuses are typically monitored by measuring suitable parameters. The term 'condition monitoring' for increasing safety and plant efficiency is used here. To this end devices are on the one hand equipped with various sensors, which measure or record suitable parameters such as e.g. oscillations of the devices.

The term devices refer to devices which are arranged directly on/in the plant, and which are also sometimes referred to below simply as devices. Automation devices moreover have monitoring functions in order to detect external interruptions, e.g. short-circuit, wire break, overcurrent etc. or in order to detect internal interruptions, e.g. programming errors, memory overflows etc.

Detected interruptions of the devices, i.e. the device status, are reported to higher-level systems, e.g. PLC, HMI or other software. These reports provide an overview of the status of the individual automation components.

It would be desirable and advantageous to provide a less complicated diagnostic tool and a method for simple determination of an interruption in a plant.

SUMMARY OF THE INVENTION

According to one aspect of the present invention, a diagnostic tool having stored thereon a computer software program embodied in a non-transitory computer readable medium for determining an interruption in a plant with at least one device, that, when executed by a processor of the diagnostic tool causes the processor to determine a plant status at a recording time by recording at least one plant status value and transmit the plant status to the diagnostic tool, determine a device status at a recording time by recording at least one device status value and transmit the device status to the diagnostic tool, assign a shared time base to the transmitted device status and the transmitted plant status, and correlate the transmitted device status and the transmitted plant status by coordinating the device status and the plant status on the shared time base.

According to another aspect of the present invention, a diagnostic method for determining an interruption in a plant having at least one device includes determining a plant status at a recording time by recording at least one plant status value and transmitting the plant status to a diagnostic tool, determining a device status at a recording time by recording at least one device status value and transmitting the device status to the diagnostic tool, assigning a shared time base to the transmitted device status and the transmitted plant status, and correlating the transmitted device status and the transmitted plant status by coordinating the device status and the plant status on the shared time base.

According to yet another aspect of the present invention, a computer software program embodied in a non-transitory computer readable medium for determining an interruption in a plant with at least one device includes machine code which, when processed by a processor of a diagnostic tool causes the processor to determine a plant status at a recording time by recording at least one plant status value and transmit the plant status to the diagnostic tool, determine a device status at a recording time by recording at least one device status value and transmit the device status to the diagnostic tool, assign a shared time base to the transmitted device status and the transmitted plant status, and correlate the transmitted device status and the transmitted plant status by coordinating the device status and the plant status on the shared time base.

Up to now a correlation between a plant status and a device status had to be carried out in different tools and be carried out manually by the end user, i.e. there are different tools with different time bases for the different statuses. It had to be noted here that the different tools had different time bases. In accordance with the invention it was recognized that during a non-operation in the plant, it could not be recognized whether an interruption was in the plant, in the device or a planned non-operation. A categorization of the interruption, according to an interruption due to maintenance or during operation, was therefore only possible with considerable manual effort. A correlation between the statuses could only be carried out by experts who have connected the statuses manually, e.g. by means of expert knowledge relating to connected events.

By correlating the plant status and device status at a recording time, i.e. at the same point in time, wanted interruptions, e.g. maintenance of an automation device, and unwanted interruptions can be diagnosed more accurately. Interruptions which occur during operation of the plant are more serious interruptions since they interfere with the customer's production.

Information can be provided with a time base by integrating the machine and device status at a recording time, i.e. at the same point in time. On account of the shared time base, the interruption can be manually or automatically categorized by evaluating the machine and device status. The categorization can be used as a basis for further evaluations, e.g. OEE (Overall Equipment Effectiveness), availability etc.

The information relating to the plant and device status can be determined using different mechanisms and protocols.

According to another advantageous feature of the invention, the coordination on a shared time base can be effected by integrating the device status and the plant status into the diagnostic tool. The integration of the plant and device status allows information to be provided with a time base. Also with the integration of the plant status and the device status, the same time stamp can be allocated to the plant status and to the device status.

According to another advantageous feature of the invention, a categorization of the interruption can be effected by evaluating the correlated device status and the correlated plant status on the shared time base.

According to another advantageous feature of the invention, the categorization of the interruption may advantageously be subdivided into the following categories:
a) Interruption during operation (interfering with production)
b) Interruption during maintenance and downtime (not interfering with production)

According to another advantageous feature of the invention, the evaluation can be carried out manually or automatically.

According to another advantageous feature of the invention, the correlated device status and the correlated plant status can be displayed graphically. This visualization can be colored bars on a chart, for instance.

According to another advantageous feature of the invention, the device status and the plant status at least may include information relating to the operation and/or downtime. Naturally other or further information relating to the operation or downtime can also be included.

According to another advantageous feature of the invention, the diagnostic tool may advantageously, but not necessarily, be configured as a software tool.

According to another advantageous feature of the invention, the recording, the transmission of the device status and also the plant status and the assignment to a time base can also be carried out with little or even no time offset.

According to another advantageous feature of the invention, the time base may include the date and/or the current time.

BRIEF DESCRIPTION OF THE DRAWINGS

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Figure 1:
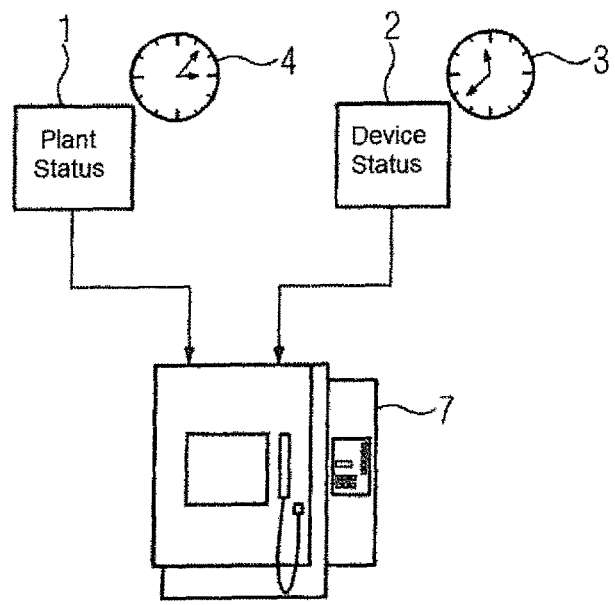
FIG. 1 shows a connection of a plant status and a device status according to the prior art.

Throughout the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows a connection between a plant status 1 and a device status 2 according to the prior art. Here the plant status 1 is determined by recording at least one plant status value at a recording time.

The plant status 1 can include e.g. information relating to the utilization time, idle time, interruption, maintenance, servicing etc. Moreover, the plant status 1 can also include the device status(es) 2.

The device status 2 can be determined by recording at least one device status value at the same recording time. A connection between the statuses proved to be difficult since the different tools have different time bases and time stamps. In other words, even when the recording time is the same, the time bases/time stamps are not identical. Here the time base in this example includes the regular time. The categorization of the interruption of a plant or of an automation device, in respect of an interruption due to maintenance or an interruption during operation, and the associated controller 7 are only possible with considerable manual effort.

The time bases can moreover be changed by higher-level tools or external actions. As a result a correlation of plant status and device status 2 is not possible. For example, the plant status 1 has a plant status time 4 or a time stamp of 15.06. The device status 2 also has a different time base, namely showing 19.58 as the device status time 3.

A correlation between the statuses could only be carried out by experts who have connected the statuses manually, e.g. by means of expert knowledge relating to connected events. This is now avoided with the aid of the invention.

Figure 2:
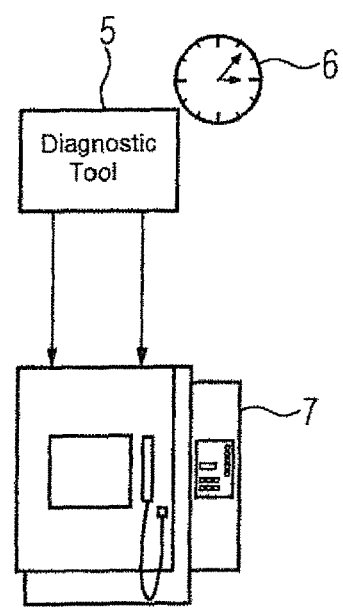
FIG. 2 shows an inventive diagnostic tool.

FIG. 2 shows a diagnostic tool 5 according to the invention. The plant status 1 (FIG. 1) is likewise determined by recording at least one plant status value. Moreover, the plant status 1 (FIG. 1) is transmitted to the inventive diagnostic tool 5.

The device status 2 (FIG. 2) is likewise determined by recording at least one device status value. The device status 2 (FIG. 1) is transmitted to the inventive diagnostic tool 5. Here the transmission of the plant status 1 (FIG. 1) and of the device status 2 (FIG. 2) takes place at the same point in time, i.e. in parallel. In accordance with the invention a shared time base 6 is now assigned to the transmitted device status 2 (FIG. 1) and the transmitted plant status 1 (FIG. 1). When a time stamp was already available, which was transmitted with the plant status 1 (FIG. 2) or device status 2 (FIG. 2), the time base 6 can overwrite or additionally assign this. By coordinating the device status 2 (FIG. 2) and the plant status 1 (FIG. 2) on the shared time base 6, the transmitted device status and the transmitted plant status can be correlated.

The correlation between plant status 1 (FIG. 2) and device status 2 (FIG. 2) can be effected by integrating both statuses into a diagnostic tool 5.

In accordance with the invention, the information is thus provided with a time base 6 by integrating the plant status 1 (FIG. 2) and the device status 2 (FIG. 2). On account of the shared time base 6 the interruption can be manually or automatically categorized by evaluating the plant status 1 (FIG. 2) and device status 2 (FIG. 2). The categorization can be used in the control device 7 etc. for instance as a basis for further evaluations, e.g. OEE (Overall Equipment Effectiveness), availability etc.

The integration of the plant and device status in a tool with a shared time base 6 provides the user with the option of easily correlating both statuses.

The information relating to the plant status 1 and device status 2 can be determined using different mechanisms and protocols.

Figure 3:
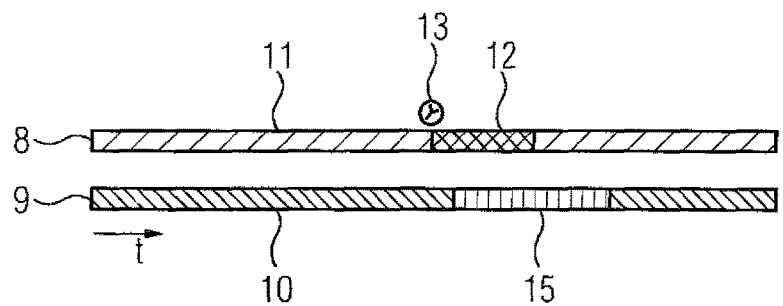
FIG. 3 shows a graphical representation of the device status and the plant status of an interruption during operation of a plant.

FIG. 3 shows a production-interfering interruption during operation. Here the device status 2 and the plant status 1 are visually displayed as graphical bars. Here the device status bar 8 is shown as the top bar and for the sake of clarity is also described in the text below as top bar 8. The plant status bar 9 is shown as the bottom bar and for the sake of clarity is also described in the text below as bottom bar 9. The plant status bar 9 and the device status bar 8 are plotted over the time t, which represents the basis of the shared time base 6 (FIG. 3).

Here the plant may be in the production operating phase of the plant. This is identified in the plant status bar 9 as number 10. The plant may however also be in a plant interrupted status (interrupted status of the plant). This is identified in the plant status bar 9 as plant interrupted status 15.

The device may likewise be in the operating phase. This is identified in the device status bar 8 as number 11. The device may however also be in a device interrupted status (interrupted status of the device). This is identified in the device status bar 9 as device interrupted status 12.

On account of the shared time base 6 the interruption can be categorized manually or automatically by evaluating the plant status 1 and device status 2.

Here a categorization of the interruption is advantageously performed according to the following categories:
 a) Interruption during operation (interfering with production)
 b) Interruption during maintenance and downtime (not interfering with production)

In an advantageous embodiment, graphical icons (displays) 13 are also attached to the bars 8 and 9, which were transmitted by means of the plant status values and device status values as with information relating to maintenance and other events. It is thus easy to recognize whether the interruption is a production-interfering interruption or a non-production-interfering interruption.

FIG. 3 shows the occurrence of an interruption of the device (device interrupted status 12) during productive operation 10 due to a device interruption or device restart, for instance, which interferes with production and results in an unplanned downtime of the plant.

These interruptions are unplanned and result in financial losses for the customer.

Figure 4:
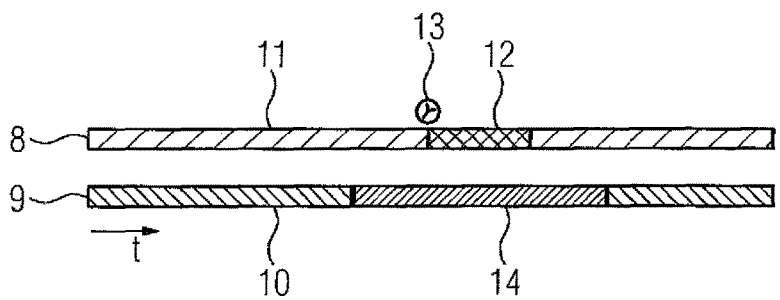
FIG. 4 shows a graphical representation of the device status and the plant status of a device interruption during the maintenance phase of a plant.

FIG. 4 shows an interruption which does not interfere with production during operation.

The production operating phase of the plant is also identified here in the plant status bar 9 as number 10. When the plant is in a maintenance status (maintenance phase 14 of the plant), this is identified here in the plant status bar 9 as number 14.

The device may be in the operating phase here. This is also identified here in the device status bar 8 as number 11. The device may however also be in a device interrupted status (interrupted status of the device). This is also identified here in the device status bar 9 as number 12.

When a device interrupted status 12 (interrupted status of the device) occurs during a maintenance phase 14 of the plant, this does not interfere with production and does not result in an unplanned downtime of the plant.

Figure 5:
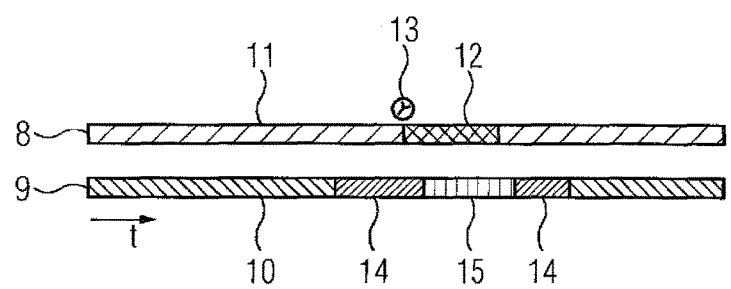
FIG. 5 shows a graphical representation of the device status and of the plant status of a plant and device interruption during the maintenance phase of a plant.

FIG. 5 likewise shows an interruption which does not interfere with production during operation.

The production operating phase of the plant is also identified here in the plant status bar 9 as number 10. When the plant is in a maintenance status (maintenance phase of the plant), this is identified here in the plant status bar 9 as maintenance phase 14.

The device may be in the operating phase here. This is identified in the device status bar 8 as number 11. The device may however also be in a device interrupted status (interrupted status of the device). This is identified in the device status bar 9 as number 12.

When a device interrupted status 12 (interrupted status of the device) and a plant interrupted status 15 (interrupted status of the plant) occur during a maintenance phase 14 of the plant, this does not interfere with production and does not result in an unplanned downtime of the plant.

These interruptions are planned and do not result in unwanted financial losses for the customer. The categorization of the interruption can be carried out manually or automatically.

The inventive correlation of the plant status and device status enables wanted interruptions, e.g. maintenance of a plant or a device, or unwanted interruptions to be easily diagnosed more accurately. Interruptions which occur during operation of the plant are unwanted, more serious interruptions since they interfere with the production process of the customer.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A diagnostic tool having a computer software program stored thereon in a non-transitory computer-readable medium, said program including routines configured to determine whether or not an interruption of a device in a plant having a plant time base that is different from the device time base was a planned interruption when the routines are executed by a processor, said diagnostic tool comprising:
 a routine configured to determine a status of the plant by recording a plant status value at a recording time having a plant time stamp and to transmit the plant status value to the processor;
 a routine configured to determine a status of the device by recording a device status value at the recording time having a device time stamp and transmit the device status value to the processor;
 a routine configured to overwrite either the plant time stamp with the device time stamp or the device time stamp with the plant time stamp, depending on whether the device time stamp or the plant time stamp is already available, in order to assign a shared time base to the transmitted device status value and the transmitted plant status value; and
 a routine configured to correlate the transmitted device status value and the transmitted plant status value on the shared time base to determine whether the interruption in the plant is a planned interruption or an unplanned interruption.

2. The diagnostic tool of claim 1, further comprising, a routine configured to integrate the status of the device and the plant.

3. The diagnostic tool of claim 2, wherein the plant-status value and the device status value are provided the same time stamp by integration of the status of the plant and the device.

4. The diagnostic tool of claim 1, wherein the interruption is categorized as a production-interfering interruption or not a production-interfering interruption.

5. The diagnostic tool of claim 1, wherein the transmitted device status value and the transmitted plant status value are displayed graphically as a function of time on the shared time base.

6. The diagnostic tool of claim 1, wherein the device status and the plant status at least include information relating to an operation and/or a downtime of the plant.

7. The diagnostic tool of claim 6, wherein the device status and the plant status include further information relating to the operation or the downtime.

8. The diagnostic tool of claim 1, configured as a computer software automation tool.

9. The diagnostic tool of claim 1, wherein the recording, the transmitting of the device status and of the plant status and the assigning to the shared time base are executed with a minimal or with no time offset.

10. The diagnostic tool of claim 1, wherein the plant time stamp and the device time stamp include at least one of a date or a current time.

11. A diagnostic method for determining whether or not an interruption of an automated process in a plant was a planned interruption, despite the plant having a plant time base that is different from the time base of a device used by the automated process, when the diagnostic method is implemented by a processor, comprising the steps of:
 determining a status of the plant by recording a plant status value at a recording time having a plant time stamp and transmitting the plant status value to the processor;
 determining a status of the at least one device by recording a device status value at the a recording time having a device time stamp and transmitting the device status value to the processor;
 overwriting either the plant time stamp with the device time stamp or the device time stamp with the plant time stamp, depending on whether the device time stamp or the plant time stamp is already available, in order to assign a shared time base to the transmitted device status value and the transmitted plant status value; and
 correlating the transmitted device status value and the transmitted plant status value on the shared time base to determine whether the interruption in the plant is a planned interruption or an unplanned interruption.

12. The diagnostic method of claim 11, further comprising the step of integrating the status of the at least one device and the status of the plant.

13. The diagnostic method of claim 12, further comprising the step of providing the same time stamp to the plant status value and the device status value upon integration of the status of the plant and the status of the device.

14. The diagnostic method of claim 11, wherein the interruption is categorized as a production-interfering interruption or not a production-interfering interruption.

15. The diagnostic method of claim 11, further comprising the step of displaying the correlated device status and the correlated plant status graphically.

16. The diagnostic method of claim 11, wherein the steps of recording and transmitting the device status and plant status and assigning the device and plant time base to the shared time base are executed with minimal or no time offset.

17. The diagnostic method of claim 11, wherein the device status and the plant status include information relating to an operation and/or a downtime of the plant.

18. The diagnostic method of claim 17, wherein the device status and the plant status include further information relating to the operation or downtime.

19. Diagnostic apparatus having a software program stored in a non-transitory computer-readable medium therein, said program including routines configured to determine whether or not an interruption of a device in a plant having a plant time base that is different from the device time base was a planned interruption, said diagnostic apparatus comprising:
 a processor configured to execute the software program; and a software program configured to be executed by the configured to execute a software program processor, said software program including
 a routine configured to determine a status of the plant by recording a plant status value at a recording time having a plant time stamp and transmit the plant status value to the processor;
 a routine configured to determine a status of the device by recording a device status value at the recording time having a device time stamp and transmit the device status value to the processor;
 a routine configured to overwrite either the plant time stamp with the device time stamp or the device time stamp with the plant time stamp, depending on whether the device time stamp or the plant time stamp is already available, in order to assign a shared time base to the transmitted device status value and the transmitted plant status value; and
 a routine configured to correlate the transmitted device status value and the transmitted plant status value on the shared time base to determine whether the interruption in the plant is a planned interruption or an unplanned interruption.

* * * * *